United States Patent
Lam

(10) Patent No.: US 10,505,867 B2
(45) Date of Patent: Dec. 10, 2019

(54) SWITCH FABRIC SYSTEM AND DATA SWITCHING METHOD

(71) Applicant: HUAWEI TECHNOLOGIES CO., LTD., Shenzhen, Guangdong (CN)

(72) Inventor: Wan Lam, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/851,283

(22) Filed: Dec. 21, 2017

(65) Prior Publication Data
US 2018/0139151 A1 May 17, 2018

Related U.S. Application Data

(63) Continuation of application No. PCT/CN2016/086765, filed on Jun. 22, 2016.

(30) Foreign Application Priority Data

Jun. 25, 2015 (CN) .......................... 2015 1 0354932

(51) Int. Cl.
*H04L 12/933* (2013.01)
*H04L 12/863* (2013.01)
(Continued)

(52) U.S. Cl.
CPC .......... *H04L 49/101* (2013.01); *H04L 47/628* (2013.01); *H04L 47/6255* (2013.01);
(Continued)

(58) Field of Classification Search
CPC . H04L 49/101; H04L 49/1515; H04L 49/253; H04L 49/3018; H04L 47/628; H04L 47/6255; H04L 47/6225
See application file for complete search history.

(56) References Cited

U.S. PATENT DOCUMENTS 5,123,011 A * 6/1992 Hein ..................... H04Q 3/521
340/14.2
5,148,428 A 9/1992 Lee
(Continued)

FOREIGN PATENT DOCUMENTS

CN 1404254 A 3/2003
CN 1747606 A 3/2006
(Continued)

OTHER PUBLICATIONS

Awdeh R Y et al: "Survey of ATM switch architectures",Computer Networks and ISDN Systems, North Holland Publishing. Amsterdam, NL, vol. 27, No. 12, Nov. 1, 1995, XP004002747, 47 pages.
(Continued)

*Primary Examiner* — Min Jung
(74) *Attorney, Agent, or Firm* — Fish & Richardson P.C.

(57) ABSTRACT

The present disclosure provides a switch fabric system, the system including M first crossbar units (CUs) and N second CUs, where each first CU includes L first input ports, a first arbiter, a first crossbar, and N first output ports. Each second CU includes M second input ports, a second arbiter, a second crossbar, and one second output port. M×N first output ports of the M first CUs are respectively coupled to N×M second input ports of the N second CUs, where N first output ports of each first CU are respectively coupled to and in a one-to-one correspondence with one second input port of each second CU in the N second CUs. In the example system, N equals M×L, and M, N, and L are all positive integers.

14 Claims, 6 Drawing Sheets

(51) Int. Cl.
*H04L 12/935* (2013.01)
*H04L 12/937* (2013.01)

(52) U.S. Cl.
CPC ........ *H04L 49/1515* (2013.01); *H04L 49/253* (2013.01); *H04L 49/3018* (2013.01); *H04L 47/6225* (2013.01)

(56) References Cited

U.S. PATENT DOCUMENTS

| | | | |
|---|---|---|---|
| 5,784,374 A | 7/1998 | Runaldue | |
| 2004/0085979 A1 | 5/2004 | Lee et al. | |
| 2004/0165598 A1* | 8/2004 | Shrimali | H04L 49/254 370/395.42 |
| 2005/0152352 A1* | 7/2005 | Jun | H04L 47/527 370/388 |
| 2008/0098151 A1* | 4/2008 | Purcell | G06F 13/1647 710/317 |
| 2008/0151897 A1* | 6/2008 | Nemoto | H04L 49/552 370/392 |
| 2008/0303628 A1 | 12/2008 | Rojas-Cessa et al. | |
| 2011/0032934 A1 | 2/2011 | Lin | |
| 2013/0083793 A1* | 4/2013 | Lea | H04L 49/1515 370/388 |
| 2015/0043906 A1 | 2/2015 | Zhou et al. | |

FOREIGN PATENT DOCUMENTS

| | | |
|---|---|---|
| CN | 101656893 A | 2/2010 |
| CN | 102763350 A | 10/2012 |
| CN | 105099956 A | 11/2015 |
| EP | 2416254 A1 | 2/2012 |

OTHER PUBLICATIONS

Extended European Search Report issued in European Application No. 16813704.0 dated Jun. 1, 2018, 7 pages.
International Search Report and Written Opinion in International Application No. PCT/CN2016/086765, dated Aug. 29, 2016, 20 pages.
Chinese Office Action in Chinese Application No. 201510354932.0, dated Sep. 22, 2017, 10 pages.

* cited by examiner

SWITCH FABRIC SYSTEM AND DATA SWITCHING METHOD

CROSS-REFERENCE TO RELATED APPLICATIONS

This application is a continuation of International Application No. PCT/CN2016/086765, filed on Jun. 22, 2016, which claims priority to Chinese Patent Application No. 201510354932.0, filed on Jun. 25, 2015, both of which are hereby incorporated by reference in their entireties.

TECHNICAL FIELD

The present invention relates to communications technologies, and in particular, to a switch fabric system and a data switching method.

BACKGROUND

A switch fabric (SF for short) switches data from an input port to a corresponding output port. A typical switch fabric structure is a crossbar (Crossbar) structure, and the crossbar includes a bufferless crossbar (Bufferless Crossbar) and a buffered crossbar (Buffered Crossbar).

Both the bufferless crossbar and the buffered crossbar are crossbars that implement N×N by using N N×1 multiplexers (MUX for short). A difference between them lies in that the bufferless crossbar has no buffer and selects and sends data from an input port to a corresponding output port according to control of one N×N arbiter (Arbiter), and the buffered crossbar has $N^2$ buffers (buffer) and selects and sends data from an input port to a corresponding output port according to control of N N×1 arbiters.

However, an algorithm of the N×N arbiter in the bufferless crossbar is complex, and the buffered crossbar needs $N^2$ independent buffers. Therefore, an area of the crossbar is increased. When N has a relatively large value, it is difficult to implement the two crossbars, causing low performance.

SUMMARY

Embodiments of the present invention provide a switch fabric system and a data switching method to reduce complexity of an algorithm and an area of a crossbar, and can reduce difficulty in implementing an SF system and improve performance when there is a relatively large quantity of input ports and output ports.

According to a first aspect, an embodiment of the present invention provides a switch fabric system, including:

M first crossbar units CUs and N second CUs, where each first CU includes: L first input ports, a first arbiter, a first crossbar, and N first output ports, each second CU includes: M second input ports, a second arbiter, a second crossbar, and one second output port, and M×N first output ports of the M first CUs are respectively coupled to N×M second input ports of the N second CUs, where N first output ports of each first CU are respectively coupled to and in a one-to-one correspondence with one second input port of each second CU in the N second CUs, N=M×L and M, N, and L are all positive integers; where any first input port in each first CU is configured to receive and cache data, and generate a first scheduling request according to the received data, where the data carries a destination port, the destination port is a second output port of any second CU in the N second CUs, and the first scheduling request is used to request to send the data to the destination port by using the N first output ports; the first arbiter is configured to perform scheduling and arbitration on the first scheduling request to determine a first target output port that matches the destination port and generate a first scheduling grant, where the first target output port is one first output port that is coupled to the any second CU in N first output ports of each first CU, and the first scheduling grant is used to instruct the any first input port to send the data to the first target output port; the any first input port is further configured to schedule the data to the first crossbar according to the first scheduling grant; and the first crossbar is configured to switch the data to the first target output port under configuration of the first arbiter; and a second target input port in the any second CU is configured to receive and cache the data, and generate a second scheduling request, where the second target input port is one second input port that is in the any second CU and that is coupled to the first target output port, and the second scheduling request is used to request to use the second output port of the any second CU; the second arbiter is configured to perform arbitration on the second scheduling request to generate a second scheduling grant, where the second scheduling grant is used to instruct the second target input port to send the data to the second output port of the any second CU; the second target input port is further configured to schedule the data to the second crossbar according to the second scheduling grant; and the second crossbar is configured to switch the data to the second output port of the any second CU under configuration of the second arbiter.

With reference to the first aspect, in a first possible implementation of the first aspect, the first arbiter is configured to perform scheduling and arbitration on the first scheduling request according to a preset mapping relationship to determine, from N first output ports of each first CU, the first target output port that matches the destination port, where the preset mapping relationship includes a one-to-one correspondence between N first output ports of each first CU and N second output ports of the N second CUs.

With reference to the first aspect or the first possible implementation of the first aspect, in a second possible implementation of the first aspect, the second arbiter is configured to perform arbitration on the second scheduling request according to a preset scheduling algorithm to generate the second scheduling grant, where the preset scheduling algorithm includes: round-robin RR scheduling, oldest cell first OCF scheduling, longest queue first LQF scheduling, longest port first LPF scheduling, or weighted scheduling.

With reference to any one of the first aspect or the first to the second possible implementations of the first aspect, in a third possible implementation of the first aspect, each first CU further includes L first caches, the L first caches are respectively coupled to and in a one-to-one correspondence with the L first input ports of each first CU, and the L first caches are configured to respectively cache data received by the L first input ports of each first CU.

With reference to any one of the first aspect or the first to the third possible implementations of the first aspect, in a fourth possible implementation of the first aspect, each second CU further includes M second caches, the M second caches are respectively coupled to and in a one-to-one correspondence with the M second input ports of each second CU, and the second cache is configured to cache data received by the second input port.

With reference to any one of the first aspect or the first to the fourth possible implementations of the first aspect, in a fifth possible implementation of the first aspect, the first crossbar includes N first multiplexers, the first multiplexer includes L first ingress ports and one first egress port, the L first ingress ports are respectively coupled to the L first input ports one by one, the first egress port is coupled to one first output port in the N first output ports, and the N first multiplexers are configured to implement channel gating between the any first input port and the first target output port under configuration of the first arbiter to switch the data to the first target output port.

With reference to any one of the first aspect or the first to the fifth possible implementations of the first aspect, in a sixth possible implementation of the first aspect, the second crossbar includes a second multiplexer, the second multiplexer includes M second ingress ports and one second egress port, each of the M second ingress ports is respectively coupled to one second input port of the M second input ports, the second egress port is coupled to the second output port, and the second multiplexer is configured to implement channel gating between the second target input port and the second output port of the any second CU under configuration of the second arbiter to switch the data to the second output port of the any second CU.

According to a second aspect, an embodiment of the present invention provides a data switching method, where the method is applicable to a switch fabric system, and the switch fabric system includes: M first crossbar units CUs and N second CUs, where each first CU includes: L first input ports, a first arbiter, a first crossbar, and N first output ports, each second CU includes: M second input ports, a second arbiter, a second crossbar, and one second output port, and M×N first output ports of the M first CUs are respectively coupled to N×M second input ports of the N second CUs, where N first output ports of each first CU are respectively coupled to and in a one-to-one correspondence with one second input port of each second CU in the N second CUs, N=M×L and M, N, and L are all positive integers; where the method includes:

receiving and caching, by any first input port in each first CU, data and generating a first scheduling request according to the received data, where the data carries a destination port, the destination port is a second output port of any second CU in the N second CUs, and the first scheduling request is used to request to send the data to the destination port by using the N first output ports;

performing, by the first arbiter, scheduling and arbitration on the first scheduling request to determine a first target output port that matches the destination port and generate a first scheduling grant, where the first target output port is one first output port that is coupled to the any second CU in N first output ports of each first CU, and the first scheduling grant is used to instruct the any first input port to send the data to the first target output port;

scheduling, by the any first input port, the data to the first crossbar according to the first scheduling grant;

switching, by the first crossbar, the data to the first target output port under configuration of the first arbiter;

receiving and caching, by a second target input port in the any second CU, the data and generating a second scheduling request, where the second target input port is one second input port that is in the any second CU and that is coupled to the first target output port, and the second scheduling request is used to request to use the second output port of the any second CU;

performing, by the second arbiter, arbitration on the second scheduling request to generate a second scheduling grant, where the second scheduling grant is used to instruct the second target input port to send the data to the second output port of the any second CU;

scheduling, by the second target input port, the data to the second crossbar according to the second scheduling grant; and switching, by the second crossbar, the data to the second output port of the any second CU under configuration of the second arbiter.

According to the switch fabric system and the data switching method provided in the embodiments of the present invention, by means of scheduling performed by a first arbiter and a second arbiter, data input into any first input port of a first CU is switched to a second output port of any second CU corresponding to a destination port carried by the data. This reduces complexity of an algorithm and an area of a crossbar, and can reduce difficulty in implementing an SF system and improve performance when there is a relatively large quantity of input ports and output ports.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of embodiments of the present invention clearer, the following clearly describes the technical solutions in the embodiments of the present invention with reference to accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
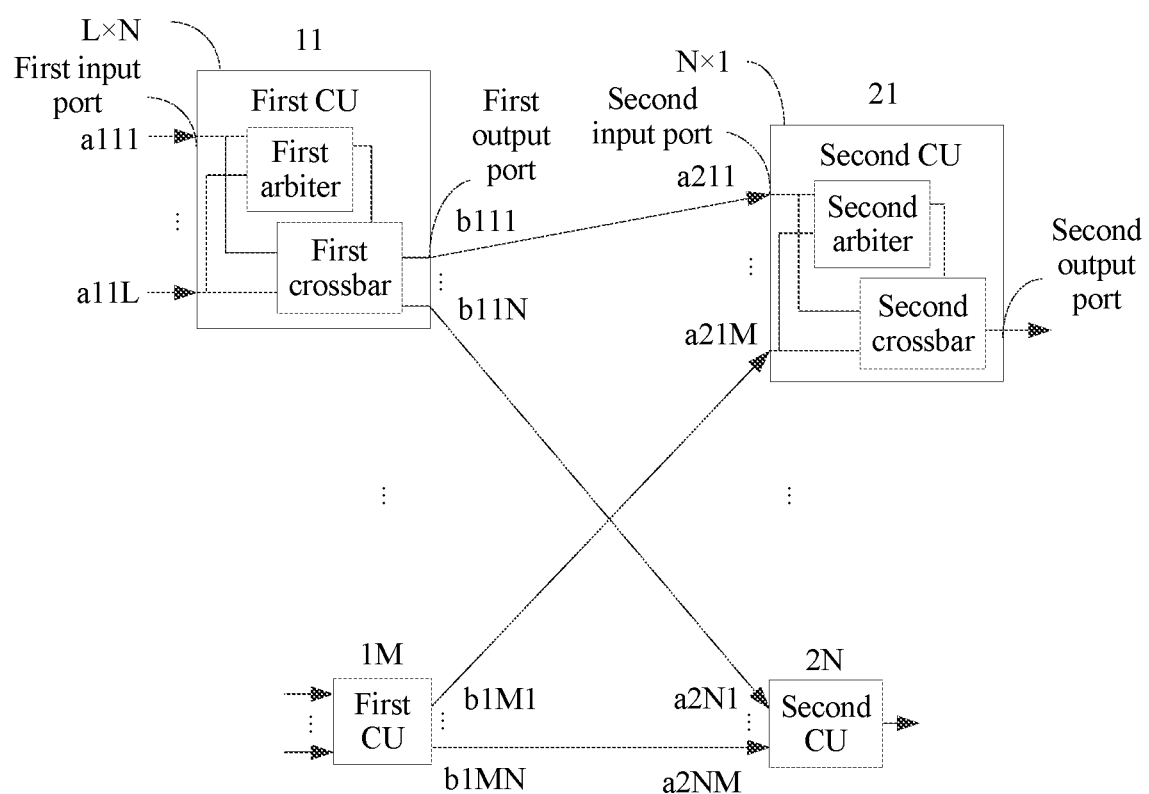
FIG. 1 is a schematic structural diagram of a switch fabric system according to an embodiment of the present invention.

FIG. 1 is a schematic structural diagram of a switch fabric system according to an embodiment of the present invention. As shown in FIG. 1, the switch fabric system includes: M first crossbar units (Crossbar Unit, CU for short) 11, . . . , and 1M and N second CUs 21, . . . , and 2N. The first CU 11 includes: L first input ports a11', . . . , and a11L, a first arbiter, a first crossbar, and N first output ports b111, . . . , and b11N. Structures of other (M−1) first CUs are the same as a structure of the first CU 11. The second CU 21 includes: M second input ports a211, . . . , and a21M, a second arbiter, a second crossbar, and one second output port. Structures of other (N−1) second CUs are the same as a structure of the second CU 21. M×N first output ports of the M first CUs are respectively coupled to N×M second input ports of the N second CUs.

For example, the first output port b111 of the first CU 11 is coupled to the second input port a211 of the second CU 21, . . . , the first output port b11N of the first CU 11 is coupled to a second input port a2N1 of the second CU 2N, a first output port b1M1 of the first CU 1M is coupled to the second input port a21M of the second CU 21, . . . , and a first output port b1MN of the first CU 1M is coupled to a second input port a2NM of the second CU 2N.

The first input port a111 in the first CU 11 receives and caches data, and generates a first scheduling request according to the received data. The data carries a destination port, the data received by the first input port a111 is encoded before being sent, the data before being encoded includes two parts: a data header and data, and the data header carries destination port information. After receiving the encoded data, the first input port a111 learns, by means of decoding, that the destination port is the second output port of the second CU 21. The first scheduling request is used to request to send the data to the second output port of the second CU 21 by using a first output port of the first CU 11. The first arbiter is configured to perform scheduling and arbitration on the first scheduling request to determine a first target output port that matches the second output port of the second CU 21, and generate a first scheduling grant. The first target output port is the first output port b111 that is coupled to the second CU 21 in the N first output ports of the first CU 11. The first scheduling grant is used to instruct the first input port a111 to send the data to the first output port b111. The first input port a111 is further configured to schedule the data to the first crossbar according to the first scheduling grant. The first crossbar is configured to switch the data to the first output port b111 under configuration of the first arbiter.

A second target input port in the second CU 21 is configured to receive and cache the data, and generate a second scheduling request, where the second target input port is the second input port a211 that is in the second CU 21 and that is coupled to the first output port b111, and the second scheduling request is used to request to use the second output port of the second CU 21. The second arbiter is configured to perform arbitration on the second scheduling request to generate a second scheduling grant, where the second scheduling grant is used to instruct the second input port a211 to send the data to the second output port of the second CU 21. The second input port a211 is further configured to schedule the data to the second crossbar according to the second scheduling grant. The second crossbar is configured to switch the data to the second output port of the second CU 21 under configuration of the second arbiter.

Further, the first arbiter is configured to perform scheduling and arbitration on the first scheduling request according to a preset mapping relationship to determine, from N first output ports of each first CU, the first target output port that matches the destination port, where the preset mapping relationship includes a one-to-one correspondence between N first output ports of each first CU and N second output ports of the N second CUs.

Further, the second arbiter is configured to perform arbitration on the second scheduling request according to a preset scheduling algorithm to generate the second scheduling grant, where the preset scheduling algorithm includes: round-robin (Round-Robin, RR for short) scheduling, oldest cell first (OCF for short) scheduling, longest queue first (LQF for short) scheduling, longest port first (LPF for short) scheduling, or weighted scheduling.

In the SF system of this embodiment, data input to the SF system may be switched by cascading the first CU and the second CU, to output the data from a corresponding output port. The first crossbar and the second crossbar in the SF system of the present invention may be buffered crossbars, and are collectively referred to as a multi-stage buffered crossbar (Multi-stage Buffered Crossbar, MBC for short). An input port of the SF system may receive a variable-length data packet and divide the variable-length data packet into invariable-length input data (such as an information element), to facilitate subsequent processing. The SF system switches the input data to the output port by using two levels of algorithms. Complexity of one N×N scheduling algorithm is originally O(N×N). In this embodiment, complexity of a first algorithm is $O_{(L \times N)}$, and complexity of a second algorithm is $O_{(M \times 1)}$. The N×N scheduling algorithm is replaced with two algorithms with relatively low complexity, where M, N, and L are positive integers that meet a formula N=M×L and may be adjusted according to an actual situation so as to facilitate scheduling mode extension.

In this embodiment, by means of scheduling performed by a first arbiter and a second arbiter, data input into any first input port of a first CU is switched to a second output port of any second CU corresponding to a destination port carried by the data. This reduces complexity of an algorithm and an area of a crossbar, and can reduce difficulty in implementing an SF system and improve performance when there is a relatively large quantity of input ports and output ports.

Figure 2:
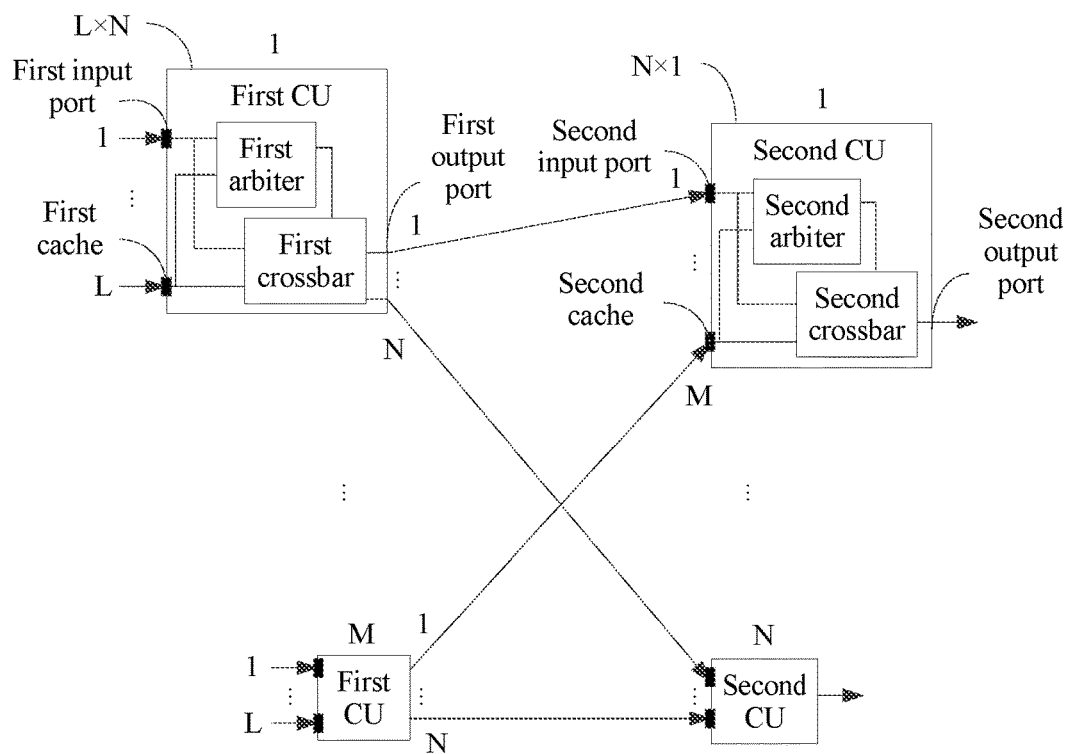
FIG. 2 is a schematic structural diagram of a switch fabric system according to another embodiment of the present invention.

FIG. 2 is a schematic structural diagram of a switch fabric system according to another embodiment of the present invention. As shown in FIG. 2, based on the system structure shown in FIG. 1, in the system of this embodiment, further, each first CU further includes L first caches, where the L first caches are respectively coupled to and in a one-to-one correspondence with the L first input ports of each first CU. The L first caches are configured to respectively cache data received by the L first input ports of each first CU. Each second CU further includes M second caches, where the M second caches are respectively coupled to and in a one-to-one correspondence with the M second input ports of each second CU; and the second cache is configured to cache data received by the second input port.

In this embodiment, by using a first cache of a first input port and a second cache of a second input port, on the one hand, both a first CU and a second CU are allowed to independently perform scheduling according to an empty or a full state of a buffer; on the other hand, the first CU and the second CU are decoupled, thereby facilitating implementation of an SF system.

Figure 3:
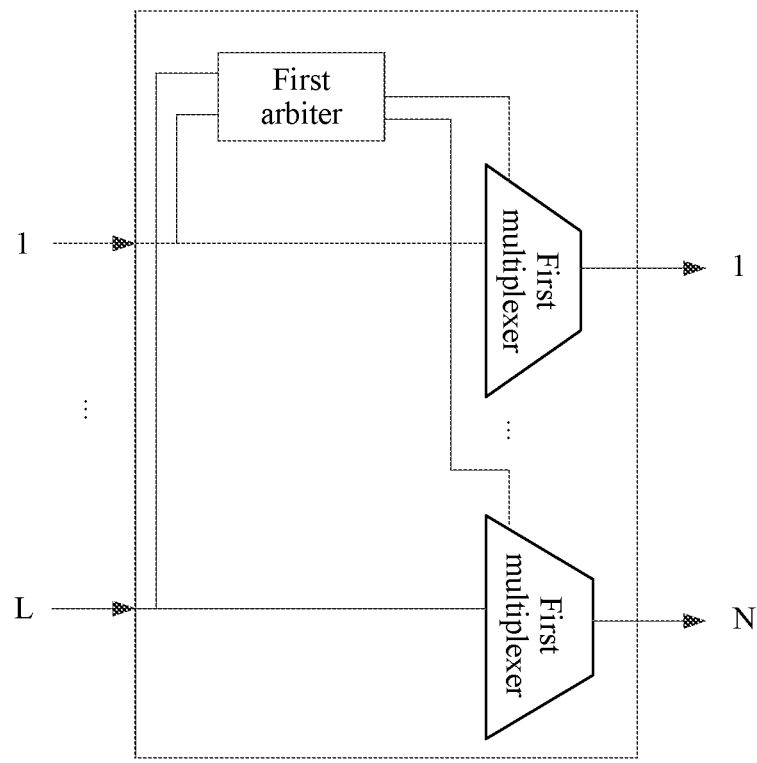
FIG. 3 is a schematic structural diagram of a first CU according to an embodiment of the present invention.

FIG. 3 is a schematic structural diagram of an embodiment of a first CU according to the present invention. As shown in FIG. 3, a structure of the first CU is based on a structure of the first CU shown in FIG. 1. A first crossbar includes N first multiplexers, and the first multiplexer includes L first ingress ports and one first egress port. The L first ingress ports are respectively coupled to the L first input ports one by one, the first egress port is coupled to one first output port in the N first output ports, and the N first multiplexers are configured to implement channel gating between the any first input port and the first target output port under configuration of the first arbiter to switch the data to the first target output port.

Figure 4:
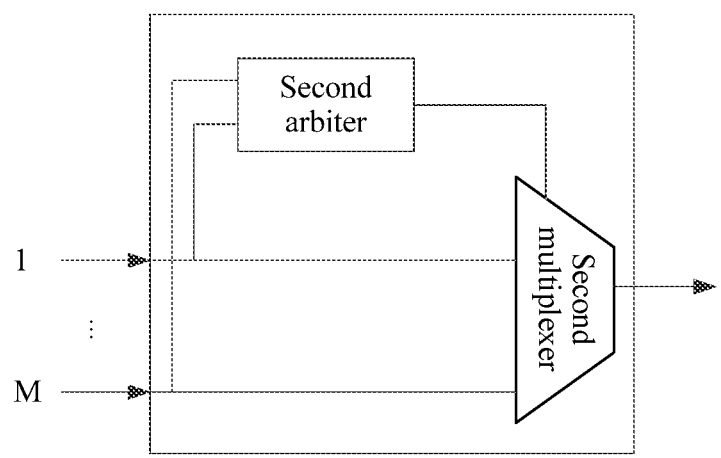
FIG. 4 is a schematic structural diagram of a second CU according to an embodiment of the present invention.

FIG. 4 is a schematic structural diagram of an embodiment of a second CU according to the present invention. As shown in FIG. 4, a structure of the second CU is based on a structure of the second CU shown in FIG. 1. A second crossbar includes one second multiplexer, and the second multiplexer includes M second ingress ports and one second egress port. Each of the M second ingress ports is respectively coupled to one second input port of the M second input ports, the second egress port is coupled to the second output port, and the second multiplexer is configured to implement channel gating between the second target input port and a second output port of the any second CU under configuration of the second arbiter to switch the data to the second output port of the any second CU.

Figure 5:
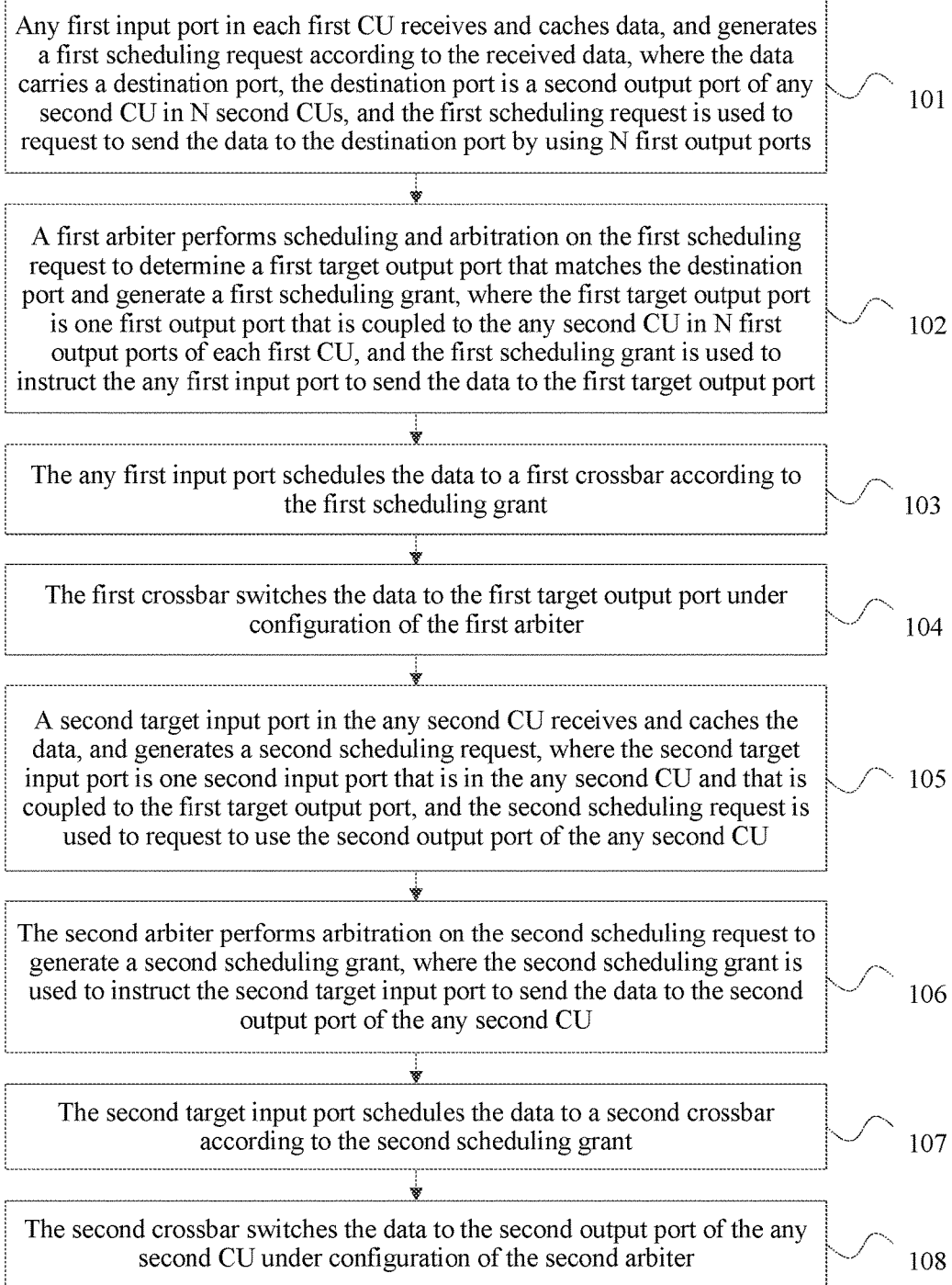
FIG. 5 is a flowchart of a data switching method according to an embodiment of the present invention.

FIG. 5 is a flowchart of a data switching method according to an embodiment of the present invention. As shown in FIG. 5, the method of this embodiment is applicable to the switch fabric system shown in FIG. 1 or FIG. 2, and the method may include:

Step 101: Any first input port in each first CU receives and caches data, and generates a first scheduling request according to the received data, where the data carries a destination port, the destination port is a second output port of any second CU in the N second CUs, and the first scheduling request is used to request to send the data to the destination port by using the N first output ports.

Step 102: A first arbiter performs scheduling and arbitration on the first scheduling request to determine a first target output port that matches the destination port, and generate a first scheduling grant, where the first target output port is one first output port that is coupled to the any second CU in N first output ports of each first CU, and the first scheduling grant is used to instruct the any first input port to send the data to the first target output port.

Step 103: The any first input port schedules the data to a first crossbar according to the first scheduling grant.

Step 104: The first crossbar switches the data to the first target output port under configuration of the first arbiter.

Step 105: A second target input port in the any second CU receives and caches the data, and generates a second scheduling request, where the second target input port is one second input port that is in the any second CU and that is coupled to the first target output port, and the second scheduling request is used to request to use the second output port of the any second CU.

Step 106: A second arbiter performs arbitration on the second scheduling request to generate a second scheduling grant, where the second scheduling grant is used to instruct the second target input port to send the data to the second output port of the any second CU.

Step 107: The second target input port schedules the data to a second crossbar according to the second scheduling grant.

Step 108: The second crossbar switches the data to the second output port of the any second CU under configuration of the second arbiter.

In this embodiment, by means of scheduling performed by a first arbiter and a second arbiter, data input into any first input port of a first CU is switched to a second output port of any second CU corresponding to a destination port carried by the data. This reduces complexity of an algorithm and an area of a crossbar, and can reduce difficulty in implementing an SF system and improve performance when there is a relatively large quantity of input ports and output ports.

The following uses several specific embodiments to describe in detail the technical solution of the method embodiment of the data switching method shown in FIG. 5.

Figure 6:
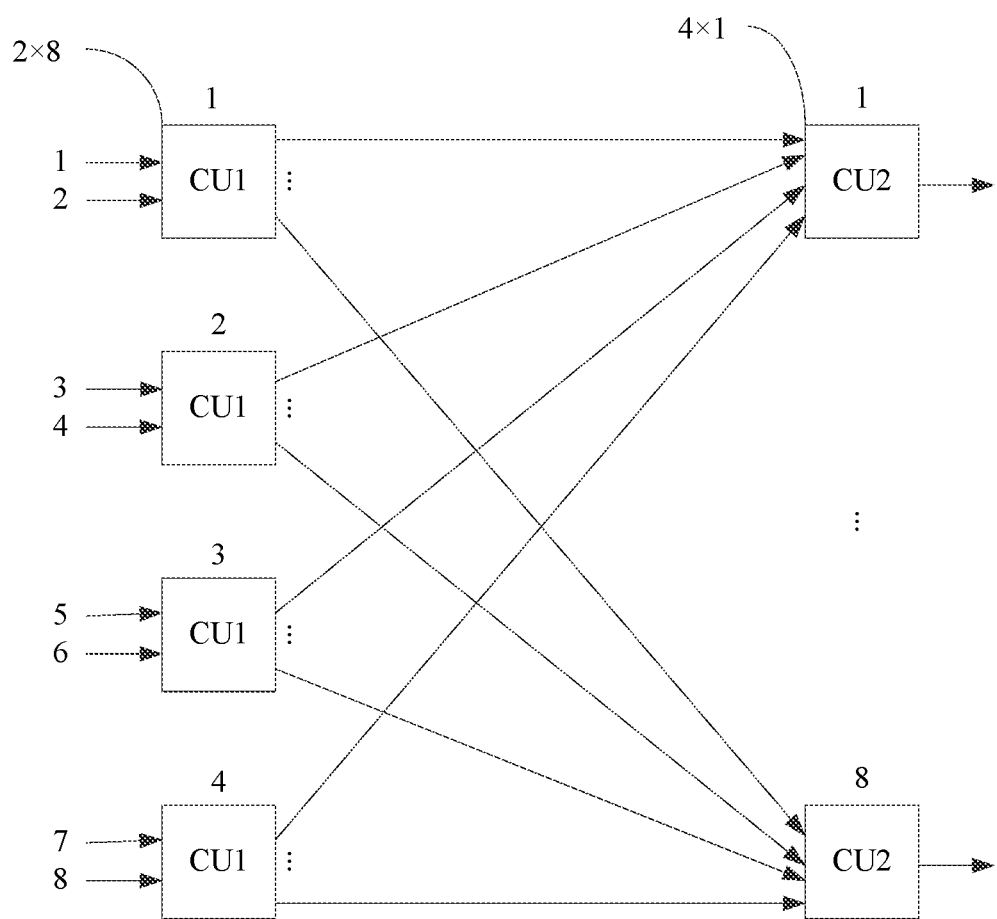
FIG. 6 is a schematic structural diagram of a switch fabric system according to still another embodiment of the present invention.

FIG. 6 is a schematic structural diagram of a switch fabric system according to still another embodiment of the present invention. As shown in FIG. 6, the switch fabric system is of an 8×8 structure, including four first CUs (CU1) and eight second CUs (CU2). One CU1 includes two first input ports and eight first output ports, one CU2 includes four second input ports and one second output port, and eight first output ports of each CU1 are respectively coupled to and in a one-to-one correspondence with one second input port of each CU2 in the eight CU2s. There is one 2×8 first arbiter in each CU1 to control switching and scheduling from a first input port to a first output port. The 2×8 first arbiter performs scheduling on two first caches one by one, a working mechanism and an algorithm of the first arbiter are the same as those of a conventional arbiter including a buffered crossbar, and details are not described herein. There is one 4×1 second arbiter in each CU2 to control switching and scheduling from a second input port to a second output port, and the 4×1 second arbiter performs 4×1 selection for four second buffers.

Specifically, a processing procedure of the CU1 includes: First, a first input port initiates a first scheduling request to a 2×8 first arbiter in a CU1 to which the first input port belongs, indicating that the input port has input data destined for a destination port. The first arbiter performs arbitration according to a first algorithm to determine a first output port that matches the destination port, generates a first scheduling grant, and notifies the corresponding first input port of the first scheduling grant. The first input port schedules the data from a corresponding first cache according to the first scheduling grant and sends the data to a first crossbar, and the first crossbar switches the data to the matched first output port under configuration of the first arbiter.

A processing procedure of the CU2 includes: First, four second input ports of the CU2 are respectively connected to one first output port of each of four CU1s. If there is data cached in a second cache, a second scheduling request is initiated to a 4×1 second arbiter of the CU2. Then, the second arbiter performs 4×1 scheduling and arbitration according to an algorithm such as RR and OCF and the second scheduling request initiated by the four second input ports, generates a second scheduling grant, and notifies a corresponding second input port of the second scheduling grant. The second input port schedules the data from a corresponding second cache according to the second scheduling grant and sends the data to a second crossbar, and the second crossbar switches the data to a second output port of the CU2 under configuration of the second arbiter.

In conclusion, an 8×8 two-level scheduling MBC shown in FIG. 6 is used as an example. Four CU1s of a first level separately complete 2×8 switching of data and caches the data in a second cache, and then eight CU2s of a second level separately complete an 8×1 switching according to an occupation status of the second cache and finally implement 8×8 switching.

Table 1 is an implementation cost comparison between the two-level scheduling MBC and the prior art. As shown in Table 1, in terms of a quantity of MUXs, complexity of (M×N) N/M×1 MUXs and N M×1 MUXs that are needed by the two-level scheduling MBC is equivalent to complexity of an existing bufferless crossbar and complexity of an existing buffered crossbar. However, a CU1 and a CU2 include two levels of MUXs, and there is a second buffer between the two levels. Therefore, the two levels of MUXs are easier to implement compared with a one-level N×1 MUX. In terms of a quantity of arbiters, the two-level scheduling MBC needs M N/M×N arbiters and N M×1 arbiters. Scheduling algorithm complexity of the arbiters of the two-level scheduling MBC is between the complexity of the bufferless crossbar and the complexity of the buffered crossbar. Difficulty of algorithm complexity of M N/M×N arbiters is much lower than difficulty of algorithm complexity of one N×N arbiter. In terms of a quantity of buffers, a structure of the two-level scheduling MBC needs only N×(M+1) buffers. A smaller value of M indicates that fewer buffers are required. For example, when N=128, the buffered crossbar needs 16384 buffers, but when M=4, the two-level scheduling MBC needs only 640 buffers, a quantity of which is about 4% of a quantity of buffers needed by the buffered crossbar.

TABLE 1

|  | Bufferless crossbar | Buffered crossbar | Two-level scheduling MBC |
| --- | --- | --- | --- |
| Quantity of MUXs | N N × 1 MUXs | N N × 1 MUXs | (M × N) L × 1 MUXs and N M × 1 MUXs |
| Quantity of arbiters | One N × N arbiter | N N × 1 arbiters | M L × N arbiters and N M × 1 arbiters |
| Quantity of buffers | None | $N^2$ buffers | N × (M + 1) buffers |

One N×N crossbar performs scheduling by three levels, and the foregoing one M×N CU1 may be further divided into P M/P×N CU11s and N P×1 CU12s. Compared with the buffered crossbar, a quantity of buffers needed by a three-level scheduling MBC is N×(P+M+1).

Figure 7:
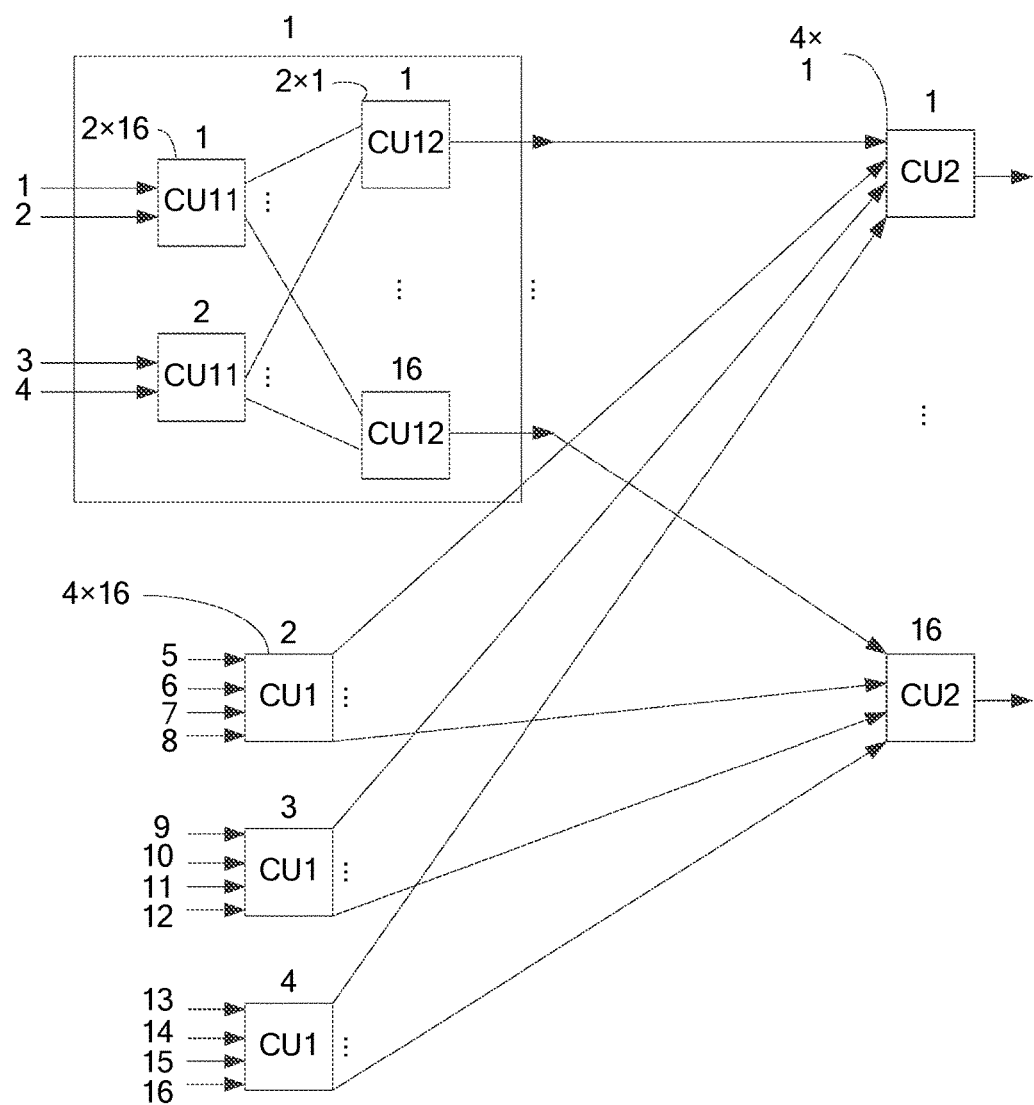
FIG. 7 is a schematic structural diagram of a switch fabric system according to yet another embodiment of the present invention.

FIG. 7 is a schematic structural diagram of a switch fabric system according to yet another embodiment of the present invention. As shown in FIG. 7, the example shown in FIG. 6 is extended, and an L×N CU1 in a two-level scheduling MBC may be further divided by cyclically using the foregoing method. If L=4, and a crossbar in which N=16, the CU1 is of a four 4×16 structure, and the CU2 is of a sixteen 4×1 structure. Each CU1 may be further divided into two levels. If L=2, a CU11 is of a two 2×16 structure, a CU12 is of a sixteen 2×1 structure. The CU11 uses a multiple input multiple output scheduling algorithm, and both the CU12 and the CU2 use a one-from-multiple scheduling algorithm. In addition, compared with a buffered crossbar that needs 256 buffers, the three-level scheduling MBC needs 112 buffers in total. When the buffers are divided into three levels, MUXs are isolated by the buffers, so that the three-level scheduling is easier to implement.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A switch fabric system, comprising:
M first crossbar units (CUs) and N second CUs, wherein each first CU of the M first CUs comprises: L first input ports, a first arbiter, a first crossbar, and N first output ports, and wherein each second CU of the N second CUs comprises: M second input ports, a second arbiter, a second crossbar, and one second output port, and wherein M×N first output ports of the M first CUs are respectively coupled to N×M second input ports of the N second CUs, wherein N first output ports of each first CU are respectively coupled to and in a one-to-one correspondence with one second input port of each second CU in the N second CUs, wherein N=M×L, and M, N, and L are all positive integers; wherein any first input port in each first CU is configured to receive and cache data, and generate a first scheduling request according to the received data, wherein the data carries a destination port, the destination port is a second output port of any second CU in the N second CUs, and the first scheduling request is used to request to send the data to the destination port by using the N first output ports;

the first arbiter is configured to perform scheduling and arbitration on the first scheduling request to determine a first target output port that matches the destination port and generate a first scheduling grant, wherein the first target output port is one first output port coupled to the any second CU in N first output ports of each first CU, and the first scheduling grant is used to instruct the any first input port to send the data to the first target output port;

the any first input port is further configured to schedule the data to the first crossbar according to the first scheduling grant; and the first crossbar is configured to switch the data to the first target output port under configuration of the first arbiter; and a second target input port in the any second CU is configured to receive and cache the data, and generate a second scheduling request, wherein the second target input port is one second input port in the any second CU and coupled to the first target output port, and the second scheduling request is used to request to use the second output port of the any second CU;

the second arbiter is configured to perform arbitration on the second scheduling request to generate a second scheduling grant, wherein the second scheduling grant is used to instruct the second target input port to send the data to the second crossbar;

the second target input port is further configured to schedule the data to the second crossbar according to the second scheduling grant; and the second crossbar is configured to switch the data to the second output port of the any second CU under configuration of the second arbiter.

2. The switch fabric system according to claim 1, wherein the first arbiter is configured to perform scheduling and arbitration on the first scheduling request according to a preset mapping relationship to determine, from N first output ports of each first CU, the first target output port that matches the destination port, wherein the preset mapping relationship comprises a one-to-one correspondence between N first output ports of each first CU and N second output ports of the N second CUs.

3. The switch fabric system according to claim 1, wherein the second arbiter is configured to perform arbitration on the second scheduling request according to a preset scheduling algorithm to generate the second scheduling grant, wherein the preset scheduling algorithm comprises at least one of round-robin (RR) scheduling, oldest cell first (OCF) scheduling, longest queue first (LQF) scheduling, longest port first (LPF) scheduling, and weighted scheduling.

4. The switch fabric system according to claim 1, wherein each first CU further comprises L first caches, wherein the L first caches are respectively coupled to and in a one-to-one correspondence with the L first input ports of each first CU, and wherein the L first caches are configured to respectively cache data received by the L first input ports of each first CU.

5. The switch fabric system according to claim 1, wherein each second CU further comprises M second caches, wherein the M second caches are respectively coupled to and in a one-to-one correspondence with the M second input ports of each second CU, and wherein the second cache is configured to cache data received by the second input port.

6. The switch fabric system according to claim 1, wherein the first crossbar comprises N first multiplexers, wherein the first multiplexer comprises L first ingress ports and one first egress port, wherein the L first ingress ports are respectively coupled to the L first input ports one by one, wherein the first egress port is coupled to one first output port in the N first output ports, and wherein the N first multiplexers are configured to implement channel gating between the any first input port and the first target output port under configuration of the first arbiter to switch the data to the first target output port.

7. The switch fabric system according to claim 1, wherein the second crossbar comprises a second multiplexer, wherein the second multiplexer comprises M second ingress ports and one second egress port, wherein each of the M second ingress ports is respectively coupled to one second input port of the M second input ports, wherein the second egress port is coupled to the second output port, and wherein the second multiplexer is configured to implement channel gating between the second target input port and the second output port of the any second CU under configuration of the second arbiter to switch the data to the second output port of the any second CU.

8. A data switching method, wherein the method is applicable to a switch fabric system, and the switch fabric system comprises: M first crossbar units (CUs) and N second CUs, wherein each first CU of the M first CUs comprises: L first input ports, a first arbiter, a first crossbar, and N first output ports, and wherein each second CU of the N second CUs comprises: M second input ports, a second arbiter, a second crossbar, and one second output port, and wherein M×N first output ports of the M first CUs are respectively coupled to N×M second input ports of the N second CUs, wherein N first output ports of each first CU are respectively, coupled to and in a one-to-one correspondence with one second input port of each second CU in the N second CUs, and wherein N=M×L, and M, N, and L are all positive integers; wherein
the method comprises:
receiving and caching, by any first input port in each first CU, data and generating a first scheduling request according to the received data, wherein the data carries a destination port, the destination port is a second output port of any second CU in the N second CUs, and the first scheduling request is used to request to send the data to the destination port by using the N first output ports;
performing, by the first arbiter, scheduling and arbitration on the first scheduling request to determine a first target output port that matches the destination port and generate a first scheduling grant, wherein the first target output port is one first output port coupled to the any second CU in N first output ports of each first CU, and the first scheduling grant is used to instruct the any first input port to send the data to the first target output port;
scheduling, by the any first input port, the data to the first crossbar according to the first scheduling grant;
switching, by the first crossbar, the data to the first target output port under configuration of the first arbiter;
receiving and caching, by a second target input port in the any second CU, the data and generating a second scheduling request, wherein the second target input port is one second input port in the any second CU and coupled to the first target output port, and the second scheduling request is used to request to use the second output port of the any second CU;
performing, by the second arbiter, arbitration on the second scheduling request to generate a second scheduling grant, wherein the second scheduling grant is used to instruct the second target input port to send the data to the second crossbar;
scheduling, by the second target input port, the data to the second crossbar according to the second scheduling grant; and
switching, by the second crossbar, the data to the second output port of the any second CU under configuration of the second arbiter.

9. The method of claim 8, wherein performing scheduling and arbitration on the first scheduling request comprises performing scheduling and arbitration on the first scheduling request according to a preset mapping relationship to determine, from N first output ports of each first CU, the first target output port that matches the destination port, wherein the preset mapping relationship comprises a one-to-one correspondence between N first output ports of each first CU and N second output ports of the N second CUs.

10. The method of claim 8, wherein performing, by the second arbiter, arbitration on the second scheduling request comprises performing arbitration on the second scheduling request according to a preset scheduling algorithm to generate the second scheduling grant, wherein the preset scheduling algorithm comprises at least one of round-robin (RR) scheduling, oldest cell first (OCF) scheduling, longest queue first (LQF) scheduling, longest port first (LPF) scheduling, and weighted scheduling.

11. The method of claim 8, wherein each first CU further comprises L first caches, wherein the L first caches are respectively coupled to and in a one-to-one correspondence with the L first input ports of each first CU, and wherein the method further comprises respectively caching, by the L first caches, data received by the L first input ports of each first CU.

12. The method of claim 8, wherein each second CU further comprises M second caches, wherein the M second caches are respectively coupled to and in a one-to-one correspondence with the M second input ports of each second CU, and wherein the method further comprises caching, by the second cache, data received by the second input port.

13. The method of claim 8, wherein the first crossbar comprises N first multiplexers, wherein the first multiplexer comprises L first ingress ports and one first egress port, wherein the L first ingress ports are respectively coupled to the L first input ports one by one, wherein the first egress port is coupled to one first output port in the N first output ports, and wherein the method further comprises implementing, by the N first multiplexers, channel gating between the any first input port and the first target output port under configuration of the first arbiter to switch the data to the first target output port.

14. The method of claim 8, wherein the second crossbar comprises a second multiplexer, wherein the second multiplexer comprises M second ingress ports and one second egress port, wherein each of the M second ingress ports is respectively coupled to one second input port of the M second input ports, wherein the second egress port is coupled to the second output port, and wherein the method further comprises implementing, by the second multiplexer, channel gating between the second target input port and the second output port of the any second CU under configuration of the second arbiter to switch the data to the second output port of the any second CU.

* * * * *

UNITED STATES PATENT AND TRADEMARK OFFICE
CERTIFICATE OF CORRECTION

PATENT NO. : 10,505,867 B2
APPLICATION NO. : 15/851283
DATED : December 10, 2019
INVENTOR(S) : Wan Lam Page 1 of 1

It is certified that error appears in the above-identified patent and that said Letters Patent is hereby corrected as shown below:

In the Claims

In Column 11, Line 48, in Claim 8, delete "respectively," and insert -- respectively --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*